INVENTORS.
FREDERICK F. LIU
TED W. BERWIN

INVENTORS.
FREDERICK F. LIU
TED W. BERWIN

United States Patent Office 2,924,777
Patented Feb. 9, 1960

2,924,777

DYNA-ELECTRONIC TRANSIENTGRAPH

Frederick F. Liu, Northridge, and Ted W. Berwin, Encino, Calif., assignors to North American Aviation, Inc.

Application December 4, 1956, Serial No. 626,805

10 Claims. (Cl. 324—83)

This invention relates to dyna-electronic transientgraphs and more particularly to methods and apparatus for producing a graphical indication of linear or nonlinear transient or oscillatory phenomena.

Many high speed reactions involve pressure changes on the order of several microseconds or less. Phenomena with such short rise times are frequently encountered in the study of rocket engines, detonation and atomic energy devices. For the study of such rapid reactions there is needed an exact knowledge not only of the amplitude of the pressure of interest but also of the pressure versus time relationship, or the true pressure wave form. Information concerning other quantities such as the rate of change of pressure is also desirable.

For the observation of such pressure phenomena, pressure pickups of finite or even limited response characteristics have been utilized. Frequently, the output of the pressure pickup and its associated electronic unit is assumed to be the true wave form of the pressure change. Some investigators have taken into consideration the frequency response characteristics and the transfer function of the measuring equipment, but have suggested only relatively laborious transform methods to accomplish the purpose.

The present invention contemplates the study of oscillatory or transient processes by the use of a modified phase plane diagram of the process. The phase plane diagram, which is the plot of the phase trajectory of a process, comprises a graphical plot, normally in rectangular or polar coordinates, of a dynamical variable of the process against the first derivative of such variable. For a mechanical oscillatory system the variable may be displacement and is plotted against the first derivative of the variable (velocity). The basic theory of the application of phase plane diagrams to the solution of problems of nonlinear phenomena is set forth in detail in "Theory of Oscillations" by Andronow and Chaken, published in 1949 by the Princeton University Press and "Nonlinear Mechanics" by Minorsky published in 1947 by J. W. Edwards. As set forth in these texts, a phase plane diagram of a particular process will yield much information concerning the process. The phase plane diagram of a mechanical system, for example, will indicate in which regions the motions are periodic and in which they are either aperiodic or asymptotic. Further, the critical thresholds which separate the regions of stability and instability may easily be ascertained from the phase trajectory. Since the phase plane diagram is a plot from which time has been eliminated, it is limited in many respects. The present invention comprises electronic apparatus for automatically plotting the phase trajectory of an oscillatory or transient process and at the same time providing time marks on the plot. Basically, a pair of electric signals respectively proportional to a dynamic variable of the process to be studied and to the first derivative of such variable are caused to move an electronically controlled display point in first and second directions respectively over a display area whereby the display point will trace the desired phase trajectory. Apparatus is provided to generate equal time interval marks on the trajectory.

It is an object of this invention to facilitate the study of linear and nonlinear systems.

A further object of this invention is to provide a method and apparatus for the study of transient or oscillatory processes.

Still another object of this invention is the determination by electronic and graphical methods of the true wave form of transient or oscillatory phenomena which may be sensed by a transducer of unknown characteristics.

A further object of this invention is the provision of a method and apparatus for the precise determination of physical constants of a measuring system.

Another object of this invention is the provision of a time marked phase plane diagram of a linear or nonlinear process.

Still another object of this invention is the improvement of the dynamic capability of a measuring system.

Other objects of invention will become apparent from the following description taken in connection with the accompanying drawings, in which Fig. 1 is a functional block diagram of the invention;

Figs. 2a and 2b depict typical diagrams of a relatively simple case of transient vibration which may be obtained by the method and apparatus of this invention;

Fig. 3 comprises a diagrammatic illustration of one method of using the diagrams of Figs. 2a and 2b;

Figure 6:
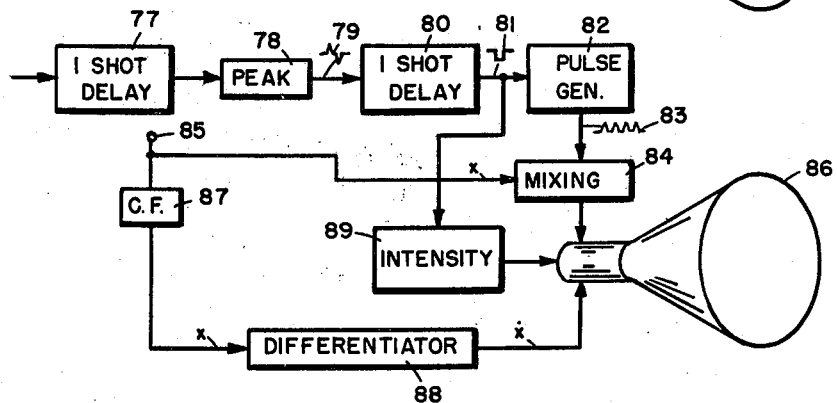
Figure 5:
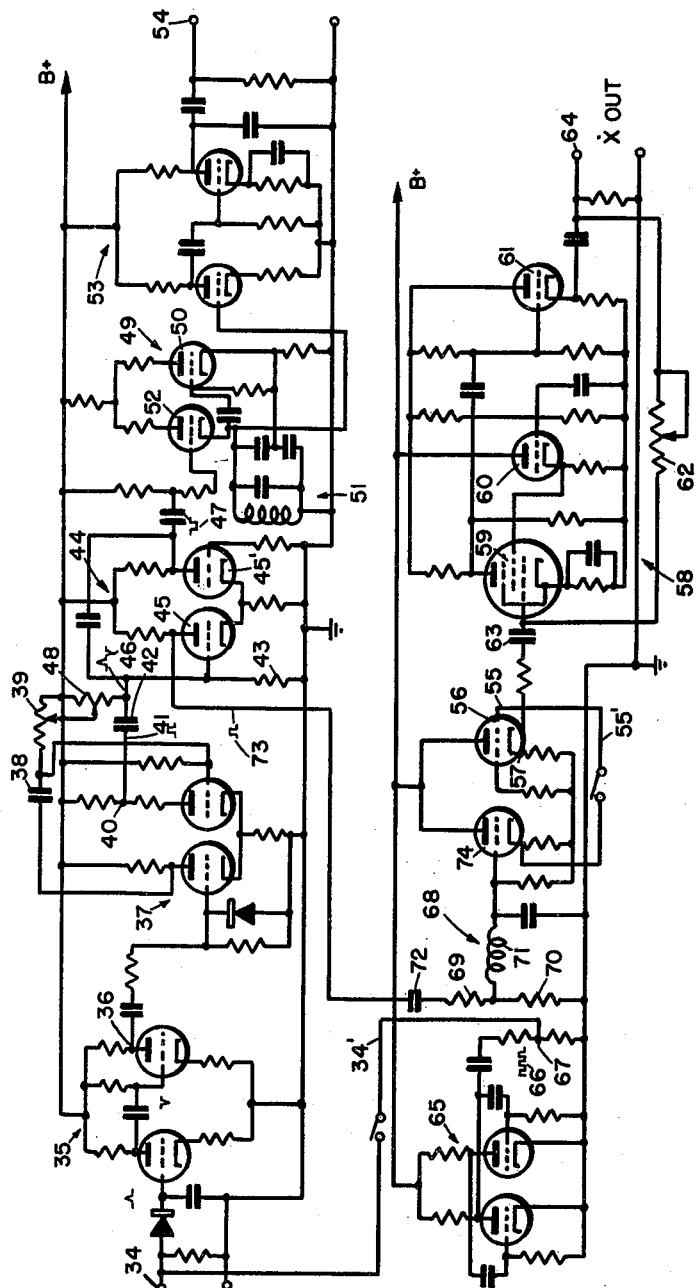
Fig. 5 is a circuit diagram of a portion of the apparatus shown in Fig. 4.

And Fig. 6 is a block diagram of a modification of a circuit of Fig. 5.

Figure 1:
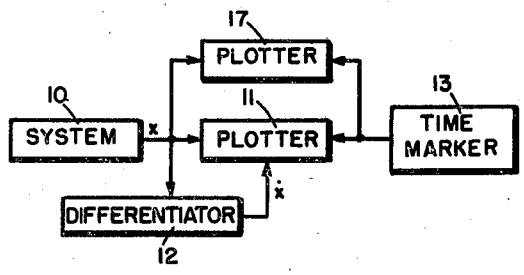
Figure 2A:
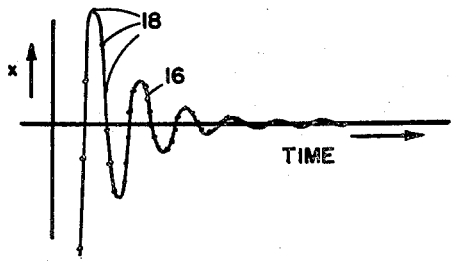
Figure 2B:
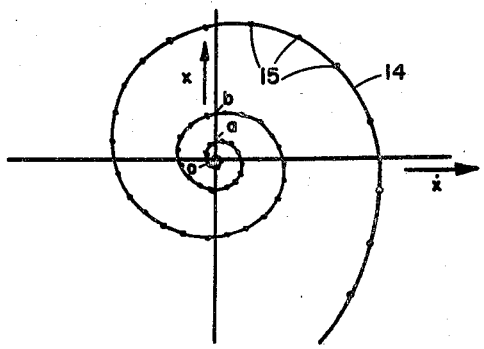

Referring now to Fig. 1, a system 10 which is to be studied may comprise either an electrical or mechanical system or some unknown physical phenomenon. There is derived from the system 10 a signal $x$ which may be the voltage in an electrical circuit, a transduced voltage representing a physical displacement of the mechanical system, or a transduced voltage representative of some other physical phenomena. The voltage $x$ is fed to a plotter 11 to control the deflection of a display point thereof in a first direction and is also fed to an electronic differentiating network 12 to provide a signal $\dot{x}$ (the first derivative of $x$ with respect to time). The signal $\dot{x}$ is fed to the plotter 11 to control the deflection of the display point thereof in a second direction. The time marker generator 13 produces short duration signals at equal time intervals which are fed to the plotter 11 to provide equal time interval marks on the trace of the display point of the plotter. If the system 10 be excited by a step function $F(t)$ to produce a signal $x$ of the form $$m\ddot{x}+b\dot{x}+x=F(t) \qquad (1)$$

it will be seen that the system is a damped oscillatory system having a resonant frequency determined by $m$ and a damping ratio determined by $b$ whereby the phase plane diagram produced by the plotter will appear as shown in Fig. 2b. The phase trajectory of Fig. 2b comprises a spiral curve 14 having a plurality of equal time interval marks 15 thereon and as described above comprises a plot of the variation of $x$ against the variation of $\dot{x}$. The resonant frequency of the system 10 may be simply determined from the curve 14 by counting the number of known time intervals, as indicated by the time marks 15, between successive crossings of the $x$ axis in the same direction. Such time count directly yields the natural period of oscillation and therefore the frequency.

For a damped oscillatory system the damping ratio, as is well-known, is determined by the logarithmic decrement which is defined as the logarithm of the ratio of the amplitudes of the dynamic variable one period apart. Thus, for the system described by the phase trajectory of Fig. 2b, the damping ratio is determined accurately by a logarithmic function of the ratio of the distance $ob$ to the distance $oa$.

While the phase plane diagram of a system of one degree of freedom has been shown for convenience of exposition it will readily be appreciated that the method and apparatus disclosed may equally well be applied to the study of more complex systems with more than one degree of freedom. This invention is particularly useful for the more complex processes for which conventional solutions are much more difficult. For example, the usual methods of determining the logarithmic decrement of a damped oscillation superimposed upon some other wave form may be highly inaccurate but the present invention will yield accurate information concerning the damping ratio for such complex systems and also for a system having a varying logarithmic decrement.

The curve 16 of Fig. 2a represents the plot of the signal $x$ against time and may, of course, be manually obtained from the time marked phase trajectory 14 by simply plotting the various values of $x$ at different times as determined by the time markers 15 of curve 14. The curve 16 may also be electrically plotted simultaneously with the plotting of the curve 14 by applying the signal $x$ to a second plotter 17 (Fig. 1) to control the deflection of the display point thereof in a first direction. The plotter may itself control the motion of the display point in a second direction as, for example, in an oscilloscope having an internally generated horizontal sweep. The time markers from the time generator 13 are fed to the plotter 17 to produce short time marks 18 on the trace 16.

Having determined the damping ratio $b$ and the natural frequency $\omega_0$ of the process represented by the phase plane diagram, there may be graphically determined the true wave form of the phenomenon $F(t)$ which produces the response $x$ of the system 10. The curve 14 is replotted as the curve 19 (Fig. 3) introducing the factor $\omega_0$ and plotting $x$ against the ratio of $\dot{x}$ to $\omega_0$ with the equal interval time marks $t_1$ through $t_5$ etc., marked on the curve. The straight line 21 is drawn through the origin at an angle 20 with the vertical axis equal to arcsin of the damping ratio. A plurality of triangles $t_1$ $t_2$ $v_1$, $t_2$ $t_3$ $v_2$ etc., are laid out each with an apex angle 22 equal to $\omega_0 \Delta_t$ where $\Delta_t$ is the time interval between successive time marks. Each triangle is oriented with its vertex $v$ falling on the line 21. On the same vertical vertical scale the curve 18, the plot of $x$ against time of Fig. 2a, is plotted together with the time marks $t_1$ through $t_5$ etc. Each vertex $v_1$, $v_2$ etc., is projected horizontally to its intersection $c_1$, $c_2$ etc., with the curve 18 and the points $d_1$, $d_2$ etc., are determined by the vertical projection of the time marks $t$ of curve 18 on the associated horizontal lines between points $c$ and $v$. The lines $d_1$ $c_1$, $d_2$ $c_2$ etc., are bisected to produce the points $e_1$, $e_2$, $e_3$ etc., which thus determine the true wave form 23 of the function $F(t)$.

Figure 3:
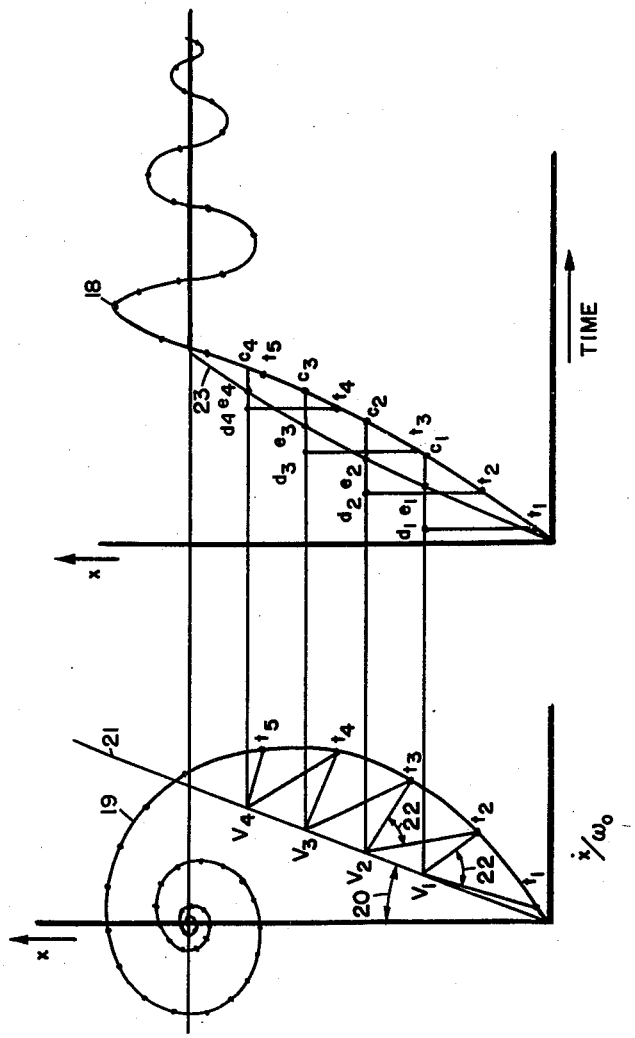

It is to be noted that Fig. 3 is merely illustrative of one graphical method of determining the true wave form of a process depicted by a phase plane diagram obtained by the methods and apparatus of this invention and the curves shown in this figure are not necessarily exact representations of any actual phenomenon.

Figure 4:
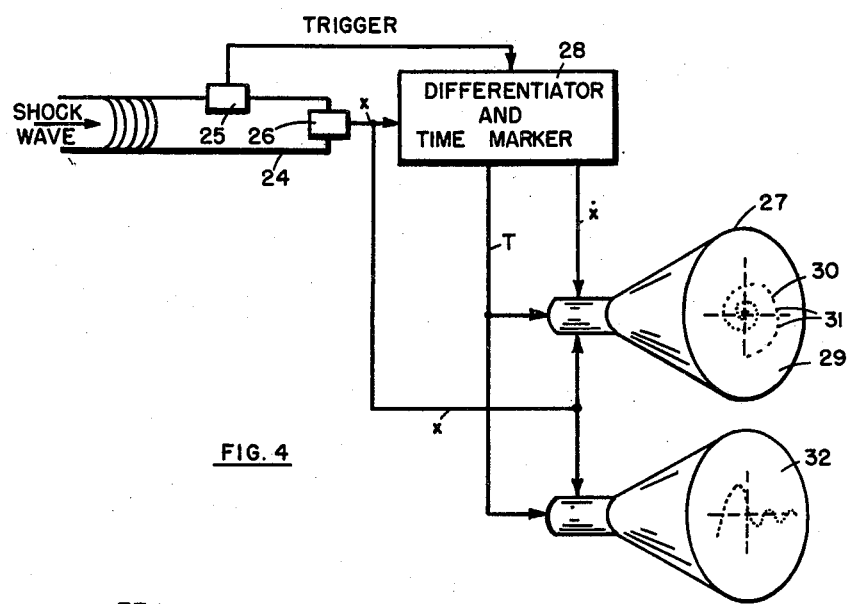
Fig. 4 is a block diagram of the invention as utilized for the study of a shock wave.

Shown in Fig. 4 is an arrangement of apparatus adapted to study a pressure phenomenon such as a single non-repetitive shock wave produced by an explosion. A shock wave travelling down shock tube 24 in a direction indicated by the arrow is sensed first by transducer 25 and then by transducer 26. The electrical output $x$ of transducer 26 with suitable amplification may be fed directly to the vertical deflection controls of a first cathode ray tube 27 to effect vertical deflection of a cathode ray thereof in accordance with the amplitude of the transducer response $x$. The response $x$ is also fed to a differentiating and time marker network 28 (more particularly described below) to provide at one of the outputs thereof, the signal $\dot{x}$ which is the time derivative of the signal $x$. The differentiated signal is fed to the horizontal deflection controls of the tube 27 to effect a horizontal deflection of the cathode ray thereof in accordance with the magnitude of the first derivative of the response of transducer 26. The cathode ray tube will thus have a display point or trace on its screen or display area 29 which traces the trajectory 30 due to the fact that the rise time of the pressure wave is beyond the linear range of the sensing transducer 26 which therefore had an oscillatory response. A trigger signal from the transducer 25 is fed to the network 28 in order to gate a time mark generator of the network 28 at the proper time. The signal T from the gated time mark generator is fed to the intensity controls of the cathode ray tube 27 to produce the time marks 31 of the trace and also to cut off the trace after a predetermined time interval.

The amplitude versus time wave form 18 of Fig. 2a may be simultaneously plotted by feeding the signal $x$ from transducer 26 to the vertical deflection control of a second cathode ray tube 32 which has an internally generated horizontal sweep (not shown). The time marks on the trace of tube 32 may similarly be produced by intensity modulation of the trace thereof in accordance with the signal T from the gated time mark generator of network 28.

The differentiator and time marker 28 of Fig. 4 may comprise the circuitry shown in Fig. 5. The trigger signal from transducer 25 is applied at a first input terminal 34 of the network to a two-stage amplifier 35. From the output 36 of amplifier 35 the trigger signal is applied to trigger a first monostable multivibrator 37 which has the period thereof controlled by capacitor 38 and variable resistor 39 whereby there will appear at the output 40 of the multivibrator the square wave 41 having a leading edge occurring at the time of the trigger input pulse and a trailing edge occurring at the time determined by the setting of resistor 39. The pulse 41 is differentiated by capacitor 42 and resistor 43 and applied to a second monostable multivibrator 44 which has the first tube 45 thereof normally conducting whereby only the negative differentiated pulse 46 will trigger the multivibrator. The gating pulse 47 appears at the plate of the second tube 45', of multivibrator 44 and has a leading edge occurring at the time of the negative differentiated pulse 46 and a trailing edge determined by the setting of resistor 48. The first multivibrator 37 provides a first time delay to effect initiation of the gating pulse 47 at a time just prior to the reception of a shock wave by the sensing transducer 26 (just prior to the initiation of the transducer response $x$). The second time delay controlled by resistor 48 determines the duration of the gating pulse 47 and therefore the duration of a visible trace on the cathode ray tubes 27 and 32 as will be presently described.

The time marks are produced by the peaks of a signal generated by oscillator 49 which comprises triode 50 having an oscillatory circuit 51 connected in the cathode to grid circuit thereof. A normally conducting tube 52 is coupled across the oscillatory circuit 51 to damp the oscillations of the oscillator 49. The gating pulse 47 is applied to the grid of the tube 52 to disable the damping thereof whereby the output of the oscillator derived from the oscillatory circuit 51 is fed to the two-stage amplifier 53 during cut off of tube 52, the duration of pulse 47. An oscillatory output is thus derived from a first output terminal 54 of the circuit during the desired time interval and may be fed as previously described to the intensity controls of the cathode ray tubes 27 and 32.

This oscillatory output repetitively intensifies the tube trace at equal time intervals as determined by the oscillator frequency.

A second input terminal 55 of the network 28 receives the output $x$ of the sensing transducer 26 and feeds this signal through a cathode follower or buffer 56 from whence the output $x$ taken from the cathode 57 is fed to a differentiating circuit 58. The differentiating circuit may comprise an operational amplifier including pentode 59, cathode follower 60 which provides the screen voltage for the pentode 59, and an output cathode follower 61. Variable feedback resistor 62 couples the output of the operational amplifier 58 to the input thereof and together with the capacitor 63 provides the electronic differentiation of the signal $x$. Thus there appears at a second output terminal 64 of the network 28 the signal $\dot{x}$ which is applied to the horizontal deflection controls of the cathode ray tube 27.

For testing of the network 28 of Fig. 5 there may also be provided a free running multivibrator 65 which produces a square wave 66 at terminal 67 thereof. This terminal may be connected by test lead 34' to the input terminal 34 to provide the trigger signal during testing. The test portion of the circuit also includes a simulated transducer 68 including resistors 69, 70, inductor 71 and capacitor 72 which may be shock excited by the pulse 73 generated at the plate of tube 45 of multivibrator 44 when the latter is triggered by the pulse 46. The response or output of the simulated transducer 68 is fed to the control grid of a test cathode follower or buffer 74 from whence the simulated transducer response may be coupled by test lead 55' to the second input terminal 55 of the circuit.

The circuitry shown in Fig. 5 is exemplary only and the functions thereof may be obtained by other circuits as will be readily apparent to those skilled in the art. The circuitry should fundamentally provide differentiation of the transducer response, time marking of the graphical plot of the indicator and gating of the indicator at the proper time interval. Instead of utilizing intensity modulation the time marking may be obtained by mixing with the signal fed to the horizontal or vertical controls of the cathode ray tube a train of pulses of known repetition rate which may be produced by differentiation of the output of a free running multivibrator or square wave oscillator. Such an arrangement is depicted in the block diagram of Fig. 6 wherein the trigger from transducer 25 of Fig. 4 may be fed to a first one shot multivibrator 77, similar to multivibrator 37, thence to a peaking or differentiating circuit 38 to provide the delayed trigger pulse 79 which is fed to a second monostable or one shot multivibrator 80 similar to multivibrator 44 to provide the gating pulse 81. An oscillator or pulse generator 82 gated by pulse 81 provides a train of pulses 83 at a predetermined repetition rate for the desired time interval which commences just prior to the excitation of transducer 26. Pulse train 83 is fed to a mixing or summing network 84 together with the response signal $x$ from transducer 26 which may be fed to input terminal 85. The output of the mixing network 84 which comprises the signal $x$ having the marking pulses 83 superimposed thereon is then fed to the vertical deflection control of the oscilloscope 86 as described in connection with Fig. 4. The input from terminal 85 is also fed through cathode follower 87 to a differentiating network 88 similar to the differentiating circuit 58 of Fig. 5. The differentiated signal from the circuit 88 is then fed to the horizontal deflection control of the oscilloscope 86 as previously described. To control the duration of the trace appearing on the screen of the oscilloscope 86, the gating signal 81 is fed to the intensity control 89 of the oscilloscope. As is well-known, the traces of the cathode ray of tubes 27, 32 and 86 may be recorded by a camera (not shown). Alternatively, the cathode ray tubes may be replaced by other visual plotting apparatus such as a recorder which may trace the plot of $x$ against $\dot{x}$ directly on a permanent recording medium.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Apparatus for indicating the phase trajectory of a transient or oscillatory process comprising means for deriving a first signal proportional to a dynamic variable of said process, means for deriving a second signal proportional to the first derivative of said variable, indicator means having a display area and means for producing a display point on said area, means responsive to said first and second signals for moving said display point in first and second directions, respectively, over said area to trace said trajectory, and means for generating time marks on said trajectory.

2. Apparatus for indicating characteristics of an excited dynamic system comprising means for generating a first electric signal proportional to a dynamic variable of said excited system, means for generating a second electric signal proportional to the first derivative of said variable, means for graphically plotting said first signal against said second signal and means for providing time marks on said graphical plot.

3. Apparatus for indicating transient phenomena sensed by a transducer comprising means for deriving a first signal which is a predetermined function of the output of said transducer, means for deriving a second signal which is a predetermined function of the first derivative of the output of said transducer, means for generating a visible indication of the variation of said first signal with said second signal, and means for time marking said indication.

4. Apparatus for recording a rapid transient phenomenon comprising means for deriving a trigger signal from said phenomenon, means for deriving from said phenomenon a response signal indicative of the wave form thereof and delayed relative to said trigger signal, means for differentiating said response signal, means responsive to said trigger signal for initiating a gating signal, means gated by said gating signal for graphically plotting said response signal against said differentiated signal during the duration of said gating signal, and means for providing time marks on said graphical plot.

5. Apparatus of the class disclosed comprising means for receiving an input signal, means for differentiating said signal to provide a first output from said apparatus, means for receiving a trigger signal, means for delaying said trigger signal, an oscillator, gating means responsive to said delayed trigger signal for gating said oscillator, said oscillator producing a gated repetitive signal as a second output from said apparatus, whereby said first output may be plotted against said input signal with timing marks provided by said second output.

6. Apparatus for indicating a rapid transient phenomenon comprising transducer means for generating a response signal representative of said phenomenon, means for differentiating said response signal, a cathode ray tube having first and second cathode ray deflection controls, means for feeding said response signal and said differentiated signal to said first and second controls respectively, and means for repetitively intensity modulating the cathode ray of said tube at a predetermined frequency.

7. The apparatus of claim 6 including means for generating a trigger signal in response to said phenomenon prior to initiation of said response signal, and means responsive to said trigger signal for gating said intensity modulating means.

8. Apparatus for producing a phase-plane diagram of an oscillatory process comprising means for deriving a first signal proportioned to a dynamical variable of said process, means for deriving a second signal proportional to the first derivative of said variable, a cathode ray tube having a cathode ray and first and second ray deflection controls, means for feeding said first and second signals to said first and second controls respectively, and means including at least one of said controls for repetitively deflecting said cathode ray at a predetermined repetition rate.

9. Apparatus for studying transient phenomena comprising means for deriving a trigger signal from said phenomena, means for deriving a response signal representative of said phenomena and delayed relative to said trigger signal, means for delaying said trigger signal, an oscillator, means responsive to said delayed trigger signal for gating said oscillator for a predetermined time, means for differentiating said response signal, means for graphically plotting said response signal against said differentiated signal, and means responsive to said oscillator for providing equal time interval marks on said graphical plot.

10. Apparatus for studying an oscillatory process comprising a first monostable multivibrator adapted to be triggered from a signal derived from said process to provide an output pulse of predetermined duration, a peaking circuit connected to the output of said multivibrator to provide a delayed trigger pulse, a second monostable multivibrator connected to the output of said peaking circuit to provide a delayed gating signal of predetermined duration, an oscillator having an oscillatory circuit, a damping circuit connected across said oscillatory circuit, said damping circuit having the input thereof connected to the output of said second multivibrator, a first output terminal coupled with said oscillator, a cathode follower having an input adapted to receive a signal proportional to a dynamical variable of said process, a differentiating circuit having the input thereof connected to the output of said cathode follower, and a second output terminal coupled with the output of said differentiating circuit, whereby the output of said differentiating circuit may be plotted against the input of said cathode follower with timing marks provided by said output terminal of said oscillator.

References Cited in the file of this patent

UNITED STATES PATENTS

| | | |
|---|---|---|
| 2,227,630 | Carnahan | Jan. 7, 1941 |
| 2,254,023 | Wright | Aug. 26, 1941 |
| 2,304,134 | Wirkler | Dec. 8, 1942 |
| 2,426,721 | Adams | Sept. 2, 1947 |
| 2,428,021 | Grieg | Sept. 30, 1947 |
| 2,576,818 | Waynick | Nov. 27, 1951 |
| 2,678,964 | Loughlin | May 18, 1954 |
| 2,863,116 | Olsson et al. | Dec. 2, 1958 |